July 21, 1953  R. T. CORNELIUS  2,646,248
FAUCET
Filed Nov. 12, 1948
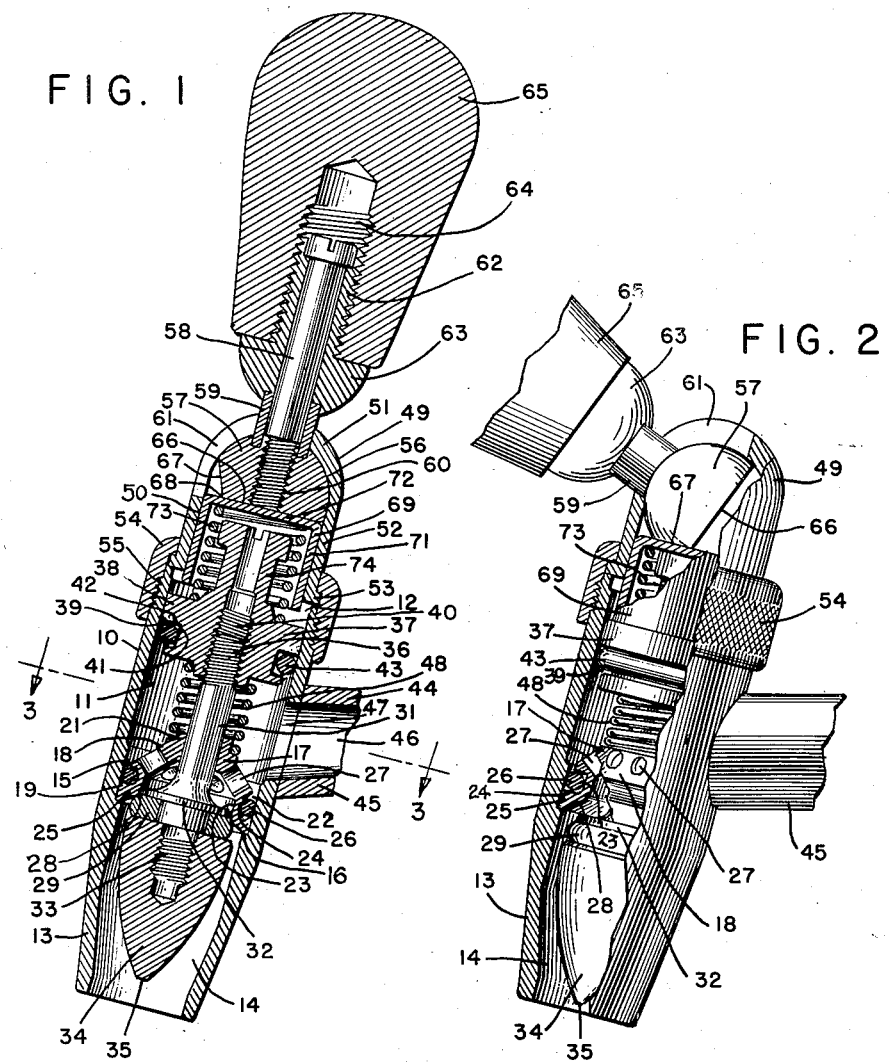
INVENTOR
RICHARD T. CORNELIUS
BY 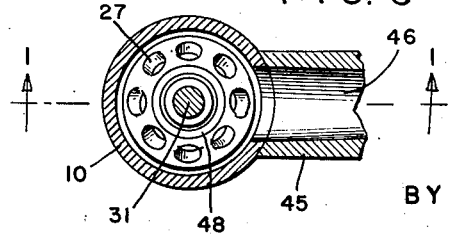
ATTORNEYS Patented July 21, 1953

2,646,248

UNITED STATES PATENT OFFICE 2,646,248

FAUCET

Richard Thomas Cornelius, Minneapolis, Minn.

Application November 12, 1948, Serial No. 59,476

8 Claims. (Cl. 251—132)

My invention relates to faucets and has for an object to provide a faucet which can be constructed at an economical cost.

Another object of the invention resides in providing a faucet which can be constructed principally from screw machine parts thereby eliminating the use of castings and the labor involved in finishing castings.

An object of the invention resides in providing a faucet having an insert including the valve seat, the valve head and guide means therefor.

A still further object of the invention resides in constructing the faucet so that the insert can be removed from the body of the faucet as a unit to permit of cleaning or repair and to permit of cleaning of the system with which the faucet is used.

A further object of the invention resides in constructing the faucet with a bore open at one end of the faucet and with an outlet at the other end of the faucet having a passageway therein communicating with said bore and of a cross sectional area less than that of the bore to form therebetween a shoulder.

Another object of the invention resides in providing the insert with a guide adapted to fit within the bore and having a portion adapted to seat against said shoulder.

A feature of the invention resides in providing a valve head seated against said valve seat and having a stem guided for movement in said guide.

An object of the invention resides in providing a plunger in the outer end of said bore and attached to said valve stem and in further providing resilient means acting between said plunger and insert.

Another object of the invention resides in providing a flexible ring between said plunger and bore and another flexible ring between said insert and bore and in further providing an inlet for the faucet communicating with the interior of the bore intermediate the flexible rings.

A further object of the invention resides in providing a cap at the open end of the said body and in providing an operating member extending through said cap and having a cam disposed upon the interior thereof.

A still further object of the invention resides in providing a slide within said cap having a head adapted to engage said cam and said plunger and is further providing resilient means acting between said slide and plunger.

Other objects of the invention reside in the novel combination and arrangement of parts and in the details of construction hereinafter illustrated and/or described.

In the drawings:

Fig. 1 is an elevational sectional view of a faucet illustrating an embodiment of my invention and taken on line 1—1 of Fig. 3.

Fig. 2 is a view similar to Fig. 1 showing the parts in altered position.

Fig. 3 is a cross sectional view taken on line 3—3 of Fig. 1.

My invention comprises a body 10 cylindrical in form and which is provided with a bore 11 extending through a portion of the same and open at one end 12. At the other end of the body 10 is provided a spout 13 which has a passageway 14 therein communicating with the bore 11. The lowermost end of the bore 11 which is indicated at 15 is slightly smaller in diameter than the bore proper 11 and the cross sectional area of the passageway 14 is less than that of the portion 15 of bore 11 to form a shoulder 16 therebetween.

Disposed within the interior of the bore 11 is an insert 17 having a conical portion 18, an annular portion 19 connected thereto and disposing the surface of the portion 15 of bore 11 and a guide 21 at the center of the insert. The annular portion 19 is formed with a groove 22 facing the surface of the portion 15 of bore 11 and having an inner cylindrical surface 23 facing said surface of bore 11 and a lower radial surface 24 facing in the same direction as the shoulder 16. The said insert further has a lip 25 which is seated on the shoulder 16. Within the groove 22 is mounted an O-ring 26 of resilient material such as rubber or the like which firmly engages the surface of the portion 15 of bore 11 and the inner cylindrical surface 23 of the insert and which is adapted to engage the radial surface 24. This ring is slightly smaller in diameter than the bore 11, to fit the portion 15 of said bore. The conical portion 18 of the insert 17 has a number of holes 27 in the same which bring the portion of the bore 11 above said insert into communication with the portion of said bore below said insert. The annular portion 19 of the insert 17 is further constructed with an annular valve seat 28 concentric with the axis of the guide 21.

Disposed within the passageway 14 in the outlet 13 is a valve head 29 which is adapted to seat against the seat 28. This valve head is constructed of rubber or some similar material and is mounted upon the end of a valve stem 31. The valve stem 31 has a collar 32 formed on the same and against which the said valve head abuts. The extreme end 33 of the valve stem 31 beyond the collar 32 is threaded to receive a tip 34 which bears against the valve head 29 and holds the same against the collar 32. The tip 34 is conical in form having a point 35 at the discharge end of the outlet 13. The surface of the said tip recedes gradually from the surface of the passageway 14 allowing the liquid passing through the outlet to gradually expand and whereby the pressure of the liquid is gradually reduced to atmospheric pressure.

The upper end 36 of the valve stem 31 is threaded and is adapted to screw into threads 40 in a plunger 37. This plunger has a portion 38 which is slidably received within the bore 11 and guides the upper end of the valve stem 31 for reciprocating movement within the body 10 of the valve. The plunger 37 has a groove 39 formed therein which is provided with a cylindrical surface 41 and a radial surface 42 connected therewith. In this groove is mounted an O-ring 43 similar to the O-ring 26 and which firmly engages the surface of the bore 11 and the surface 41 and which may engage the surface 42. The valve stem 31, valve head 29 and plunger 37 form a unit which has been termed a valve head assembly.

An inlet 44 is provided for the faucet which consists of a tube 45 having a passageway 46 therein. The said tube is brazed or soldered to the body 10 and the passageway 46 communicated with an opening 47 in the said body and brings the passageway 46 into communication with the bore 11. The inlet 44 is located so that the opening 47 is disposed between the two O-rings 26 and 43. A compression coil spring 48 encircles the valve stem 31 and is seated at one end against insert 17 and at the other end against the plunger 37. This spring serves to urge the valve head 29 against the seat 28.

Mounted on the outer end of the body 10 of the faucet is a cap 49 which has a spherical wall 51 and a cylindrical wall 52 formed with a bore 50. The cylindrical wall 52 has a flange 53 extending outwardly therefrom and which is adapted to be engaged by a nut 54. Nut 54 is secured upon threads 55 formed on the outer surface of the body 10 and serves to clamp the cap 49 firmly in position. The spherical wall 51 of cap 49 has a socket 56 in the same and in which a ball cam member 57 is mounted for oscillatory movement. This cam member has threads 60 formed into the same to receive the threaded end of a screw 58. This screw passes through a bushing 59. Bushing 59 is mounted for sliding movement in an arcuate slot 61 which is formed in the wall 51 of cap 49. The screw 58 also passes through a threaded fitting 62 which is formed with a collar 63. The fitting 62 is adapted to be screwed into threads 64 formed upon the interior of a handle or knob 65. When the handle 65 is screwed on the fitting 62, the end of said handle engages collar 63 and the screw 58 and the threaded portion of said fitting become concealed.

The cam 57 has a flat surface 66 extending radially with respect to the axis of the screw 58 and the valve stem 31 and another angular surface 67 forming a corner 68 therebetween. Disposed within the interior of the cap 49 is a slide 69 having a cylindrical wall 71 slidable along the interior of the cylindrical wall 52 of said cap. The said slide further has a radial wall 72 normally engaging the surface 66 of the cam member 57. A compression coil spring 73 encircles an extension 74 formed on the upper end of the plunger 37 and is seated at one end against the portion 38 of said plunger and at its other end against the under surface of the radial wall 72 of slide 69. This spring serves to hold the cam 57 and handle 65 in the position shown in Fig. 1 and also urges the lip 25 of insert 17 against the shoulder 16. This spring is weaker than the spring 48 so that said spring cannot unseat the valve head 29 from the valve seat 28. The slide 69, cam 57 and handle 65 form the operating means for reciprocating the valve head assembly and unseating the valve head 29.

In assembling the parts of the faucet, the following is the procedure. Valve stem 31 is first inserted into the guide 21 and moved along the same until valve head 29 reaches valve seat 28. Spring 48 is then placed about the projecting end of the valve stem 31 and the threaded end 36 of the same screwed into the threads 40 in plunger 37 until the said spring is partially compressed, urging the valve head 29 against seat 28. The O-rings 26 and 43 are next placed in the grooves 22 and 39. The cam 57 is next placed in the cap 49 and nut 54 placed over the same. The screw 58 is then run through the fitting 62 and bushing 59. Said screw and bushing are then directed into the slot 61 and the screw screwed into the threads 60 in cam member 57. Thereafter the fitting 62 is screwed into the threads 64 in handle 65. Thus two assemblies are formed, one including the insert 17, the valve parts and the plunger 37, and the other including the cap 49, handle 65 and cam member 57. In applying these assemblies to the faucet, the valve assembly is first inserted into the bore 11 through the open end 12 thereof. The ring 26 being smaller in diameter than the bore 11, fits freely in the same and the assembly may be readily slid along said bore until the ring 43 reaches the said bore. Pressure applied to the assembly forces the ring 43 into bore 11 causing the said ring to compress and to firmly engage the surface of the bore 11 and the cylindrical surface 41 of plunger 37. Further movement of the assembly into the valve body causes ring 26 to enter the portion 15 of bore 11 and to become firmly engaged with the surface of such portion of the bore and with the surface 23 of insert 17. Movement of the assembly is terminated when the lip 25 engages the shoulder 16. Spring 73 is next placed about the extension 74 of plunger 37 and the slide 69 placed over said spring. The second assembly including cap 49, handle 65 and cam member 57 are next applied with the slide 69 received within the bore 50 of said cap and with the flange 53 overlying the end of the body 10 of the faucet. Nut 54 is then screwed upon the threads 55. This draws down the flange 53 against the end of the body 10 and compresses the spring 73. It will be noted that a slight amount of clearance is provided between the end of the extension 74 and the wall 72 of slide 69. This permits of improper seating of the lip 25 on shoulder 16 and compensates for irregularities in the construction of the faucet.

In operation, pressure in the interior of the faucet forces the two O-rings 26 and 43 apart and against the surfaces 24 and 42. This prevents leakage of the liquid past the insert 17 and plunger 37. The engagement of the lip 25 on shoulder 16 is hence not relied on to procure tightness. Spring 48 hence merely serves to urge the valve head 29 against the seat 28, while spring 73 holds the handle 65 in the position shown in Fig. 1. Upon movement of the handle 65 toward the left, as noted in Fig. 1, bushing 59 travels along slot 61 and the corner 68 of cam member 57, engages the slide 69 and forces the same downward and into engagement with the extension 74. This moves the plunger 37 downwardly, unseating the valve head 29 from engagement with the seat 28 and opening the faucet. During such movement, the O-ring 43 slides along the bore 11 being lubricated by the liquid dispensed through the faucet. When the angular surface 67 of cam member 57 reaches the position shown in Fig. 2, the faucet remains open.

For the purpose of cleaning or repair, nut 54 can be removed and the cap and handle assembly comes off. The valve assembly can then be withdrawn from the bore of the faucet body and the entire interior of the faucet is open and exposed, permitting of cleaning the system in accordance with the usual practice and of cleaning or replacing the parts of the assemblies.

The advantages of my invention are manifest. The faucet can be constructed at an extremely economical cost due to the fact that all of the metal parts may be constructed on a screw machine. The valve assembly may be removed from the faucet body as a unit without disturbing the setting of the same. When this portion of the structure is removed, the entire faucet body is open permitting of ready cleaning of the interior of the system, with which the faucet is used. Should particles of foreign matter become lodged upon the shoulder 16 of the body, the same will not interfere with successful operation of the device since tightness between the valve assembly and body is not procured through this connection. A faucet constructed in accordance with my invention may have a new valve and a valve seat mounted in the same without dismantling or machining of the faucet. By the use of screw machine parts, a suitable finish can be put on the surface of the faucet, eliminating the grinding and polishing required when castings are employed.

Changes in the specific form of my invention, as herein described, may be made within the scope of what is claimed without departing from the spirit of my invention.

Having described my invention, what I claim as new and desire to protect by Letters Patent is:

1. In a faucet, an elongated body having a bore therein open at one end, an outlet at the other end of said body and having a passageway communicating with said bore, said passageway being of lesser cross sectional area than said bore to form therewith a shoulder, an insert received within said bore and having a portion seated against said shoulder, said insert having a passageway adapted to bring said bore into communication with said outlet, a valve seat on said insert encircling said passageway, a guide on said insert and concentric with said valve seat, a valve head adapted to seat against said seat, a valve stem attached to said valve head and guided for movement in said guide, said insert having an annular groove facing said bore, a flexible ring within said groove and engaging said insert and the surface of the bore of said body to form a tight connection therebetween, a plunger secured to said stem and having an annular groove facing said bore, a flexible ring within said groove and engaging said plunger and the surface of the bore of said body, an inlet in said body disposed between said rings and operating means for moving said valve stem.

2. In a faucet, an elongated body having a bore therein open at one end, an outlet at the other end of said body and having a passageway communicating with said bore, said passageway being of lesser cross sectional area than said bore to form therewith a shoulder, an insert received within said bore and having a portion seated against said shoulder, said insert having a passageway adapted to bring said bore into communication with said outlet, a valve seat on said insert encircling said passageway, a guide on said insert and concentric with said valve seat, a valve head adapted to seat against said seat, a valve stem attached to said valve head and guided for movement in said guide, said insert having an annular groove facing said bore, a flexible ring within said groove and engaging said insert and the surface of the bore of said body to form a tight connection therebetween, a plunger secured to said stem and having an annular groove facing said bore, a flexible ring within said groove and engaging said plunger and the surface of the bore of said body, an inlet in said body disposed between said rings, resilient means acting between said insert and plunger, said insert and plunger being insertable into said bore through the open end thereof and operating means for operating said plunger.

3. In a faucet, an elongated body having a bore therein open at one end, said bore having a normal portion and at its inner end a reduced portion, an outlet at the other end of said body and having a passageway communicating with said bore, said passageway being of lesser cross sectional area than the reduced end of said bore to form therewith a shoulder, an insert received within said bore and having a portion seated against said shoulder, said insert having a passageway adapted to bring said bore into communication with said outlet, a valve seat on said insert encircling said passageway, a guide on said insert and concentric with said valve seat, a valve head in said outlet adapted to seat against said seat, a valve stem attached to said valve head and guided for movement in said guide, said body having an inlet communicating with said bore at a locality intermediate said shoulder and the open end of the bore, said insert having an annular groove, a resilient ring disposed in said groove and engaging the reduced portion of said bore, a plunger slidable in the normal portion of said bore and attached to said valve stem, said plunger having an annular groove, a resilient ring disposed in said groove and engaging the normal portion of said bore, said first named ring being smaller in diameter than the normal portion of the bore to pass freely therethrough and operating means for moving said plunger.

4. In a faucet, an elongated body having a bore therein open at one end, an outlet at the other end of said body and having a passageway communicating with said bore, said passageway being of lesser cross sectional area than said bore to form therewith a shoulder, an insert insertable into said bore through the open end thereof and having a portion seated against said shoulder, said insert having a passageway adapted to bring said bore into communication with said outlet, a valve seat on said insert encircling said passageway, a guide on said insert, a valve head adapted to seat against said seat, a valve stem on said valve head and guided for movement in said guide, said bore having a reduced portion of relatively short length adjacent said shoulder, said insert having an annular groove therein, a laterally expansible sealing ring in said groove engaging the reduced portion of the bore, a plunger on said valve stem and having an annular groove therein, a laterally expansible sealing ring in said groove and engaging said bore outwardly of the reduced portion thereof, resilient means engaging said insert and said plunger and a part fixed relative to said body and urging said insert against said shoulder and said valve head against said valve seat, an inlet in said body between said sealing rings and operating means having a part engaging said plunger and moving said valve head into opening position.

5. In a faucet, an elongated body having a bore therein open at one end, an outlet at the other end of said body and having a passageway communicating with said bore, said passageway being of lesser cross sectional area than said bore to form therewith a shoulder, an insert received within said bore and having a portion seated against said shoulder, said insert having a passageway adapted to bring said bore into communication with said outlet, a valve seat on said insert encircling said passageway, a guide on said insert and concentric with said valve seat, a valve head adapted to seat against said seat, a valve stem attached to said valve head and guided for movement in said guide, a plunger secured to said stem and guided for sliding movement in said bore, said plunger, stem and head forming a valve head assembly movable as a unit, a compression coil spring encircling said stem and seated against said plunger and insert and urging said valve head against said valve seat, operating means carried by said valve body and movable from a normal to an operative position for reciprocating said valve head assembly to unseat said valve head and a second compression coil spring acting between said valve head assembly and said operating means for returning said operating means to normal position and maintaining said insert seated on said shoulder.

6. In a faucet, an elongated body having a bore therein open at one end, an outlet at the other end of said body and having a passageway communicating with said bore, said passageway being of lesser cross sectional area than said bore to form therewith a shoulder, an insert received within said bore and having a portion seated against said shoulder, said insert having a passageway adapted to bring said bore into communication with said outlet, a valve seat on said insert encircling said passageway, a guide on said insert and concentric with said valve seat, a valve head adapted to seat against said seat, a valve stem attached to said valve head and guided for movement in said guide, a plunger secured to said stem and guided for sliding movement in said bore, said plunger, stem and head forming a valve head assembly movable as a unit, a compression coil spring encircling said stem and seated against said plunger and insert and urging said valve head against said valve seat, a cam mounted for movement relative to said housing from a normal to an operative position, a slide mounted to move relative to said housing in the same direction as said valve head assembly and engageable with and movable by said cam and a second compression coil spring seated against said valve head assembly and slide and urging said insert against said shoulder and said cam into normal position.

7. In a faucet, an elongated body having a bore therein open at one end, an outlet at the other end of said body and having a passageway communicating with said bore, said passageway being of lesser cross sectional area than said bore to form therewith a shoulder, an insert received within said bore and having a portion seated against said shoulder, said insert having a passageway adapted to bring said bore into communication with said outlet, a valve seat on said insert encircling said passageway, a guide on said insert and concentric with said valve seat, a valve head adapted to seat against said seat, a valve stem attached to said valve head and guided for movement in said guide, a plunger secured to said stem and guided for sliding movement in said bore, said plunger, stem and head forming a valve head assembly movable as a unit, a compression coil spring encircling said stem and seated against said plunger and insert and urging said valve head against said valve seat, operating means carried by said valve body and movable from a normal to an operative position for reciprocating said valve head assembly to unseat said valve head and a second compression coil spring acting between said plunger and said operating means for returning said operating means to normal position and maintaining said insert seated on said shoulder.

8. In a faucet, an elongated body having a bore therein open at one end, an outlet at the other end of said body and having a passageway communicating with said bore, said passageway being of lesser cross sectional area than said bore to form therewith a shoulder, an insert received within said bore and having a portion seated against said shoulder, said insert having a passageway adapted to bring said bore into communication with said outlet, a valve seat on said insert encircling said passageway, a guide on said insert and concentric with said valve seat, a valve head adapted to seat against said seat, a valve stem attached to said valve head and guided for movement in said guide, a plunger secured to said stem and guided for sliding movement in said bore, said plunger, stem and head forming a valve head assembly movable as a unit, a compression coil spring encircling said stem and seated against said plunger and insert and urging said valve head against said valve seat, a cap attached to said body at the end of said bore, a cam carried by said cap and movable from a normal to an operative position, said cap having a guide therein coaxial with respect to the bore in said body, a slide mounted in said guide and engageable with and movable by said cam, said slide having a part engageable with said valve head assembly and urging said insert against said shoulder and said cam into normal position.

RICHARD THOMAS CORNELIUS.

References Cited in the file of this patent

UNITED STATES PATENTS

| Number | Name | Date |
|---|---|---|
| 1,071,261 | Renwick | Aug. 26, 1913 |
| 1,082,988 | Wolff | Dec. 30, 1913 |
| 1,418,664 | McNeil | June 6, 1922 |
| 1,640,527 | Brown | Aug. 30, 1927 |
| 1,936,236 | Hill | Nov. 21, 1933 |
| 2,233,717 | Shogran | Mar. 4, 1941 |
| 2,236,620 | Cornelius | Apr. 1, 1941 |
| 2,338,127 | McAndrews | Jan. 4, 1944 |
| 2,368,206 | Du Charme | Jan. 30, 1945 |
| 2,508,843 | Semak | May 23, 1950 |

FOREIGN PATENTS

| Number | Country | Date |
|---|---|---|
| 24,189 | Great Britain | of 1912 |
| 471,254 | Great Britain | of 1937 |
| 835,135 | France | 1938 |